United States Patent
Tissot et al.

(10) Patent No.: US 12,228,761 B2
(45) Date of Patent: Feb. 18, 2025

(54) OPTICAL WAVEGUIDE-BASED SIDE ILLUMINATING ASSEMBLY, ELONGATED REINFORCING STRUCTURE, AND RECEPTACLE

(71) Applicant: L.E.S.S. Ltd, Renens (CH)

(72) Inventors: Yann Tissot, Chigny (CH); Ludovic Pierre, Arc-sur-Tille (FR); Magalie Matray, St-Sulpice (CH)

(73) Assignee: L.E.S.S. LTD, Renens (CH)

(*) Notice: Subject to any disclaimer, the term of this patent is extended or adjusted under 35 U.S.C. 154(b) by 0 days.

(21) Appl. No.: 17/781,311

(22) PCT Filed: Dec. 19, 2020

(86) PCT No.: PCT/IB2020/062253
§ 371 (c)(1),
(2) Date: May 31, 2022

(87) PCT Pub. No.: WO2021/124297
PCT Pub. Date: Jun. 24, 2021

(65) Prior Publication Data
US 2022/0413200 A1    Dec. 29, 2022

Related U.S. Application Data

(60) Provisional application No. 62/952,065, filed on Dec. 20, 2019, provisional application No. 62/952,082, filed on Dec. 20, 2019.

(51) Int. Cl.
*F21V 8/00* (2006.01)
*F21V 17/10* (2006.01)
(Continued)

(52) U.S. Cl.
CPC .......... *G02B 6/001* (2013.01); *F21V 17/105* (2013.01); *F21V 23/002* (2013.01);
(Continued)

(58) Field of Classification Search
CPC .. F21V 17/105; F21V 23/002; F21V 23/0457; F21V 2200/15; G02B 6/001; G02B 6/3636
See application file for complete search history.

(56) References Cited

U.S. PATENT DOCUMENTS 5,155,788 A    10/1992    Chapin et al.
5,982,969 A *  11/1999    Sugiyama .............. B60Q 1/323
                                                                   385/125
(Continued)

FOREIGN PATENT DOCUMENTS

DE    20119861    * 12/2001    ............... F21S 4/20
EP    2317352       5/2011
(Continued)

OTHER PUBLICATIONS

English Machine Translation of DE 20119861 provided by Espacenet (Year: 2001).*

(Continued)

*Primary Examiner* — Zheng Song
(74) *Attorney, Agent, or Firm* — Aikin & Gallant, LLP

(57) ABSTRACT

An optical waveguide based side illuminating assembly having an elongated, side-emitting light waveguide, an optical protective coating surrounding the waveguide, an elongated base to which the waveguide is attached lengthwise along the elongated base, via the optical protective coating, a reflector between the optical protective coating and the elongated base and extending lengthwise along the base, and an elongated reinforcing structure embedded in the elongated base, or attached to an outer surface of the elongated base, and extending lengthwise along the elongated base. Other aspects are also described and claimed.

22 Claims, 4 Drawing Sheets

(51) Int. Cl.
*F21V 23/00* (2015.01)
*F21V 23/04* (2006.01)
*G02B 6/36* (2006.01)

(52) U.S. Cl.
CPC ........ *F21V 23/0457* (2013.01); *G02B 6/3636* (2013.01); *F21V 2200/15* (2015.01)

(56) References Cited

U.S. PATENT DOCUMENTS

| | | | |
|---|---|---|---|
| 6,104,857 A * | 8/2000 | Ishiharada | B60Q 1/26 385/141 |
| 6,154,595 A * | 11/2000 | Yokogawa | G02B 6/02033 362/558 |
| 6,234,656 B1 * | 5/2001 | Hosseini | G02B 6/001 362/558 |
| 6,547,418 B1 * | 4/2003 | Hsu | F21S 4/26 362/249.14 |
| 6,845,200 B1 | 1/2005 | Quinn | |
| 7,469,088 B2 | 12/2008 | Nothofer et al. | |
| 8,459,854 B2 | 6/2013 | Rudek et al. | |
| 9,316,802 B2 | 4/2016 | Kachmar | |
| 10,712,521 B2 | 7/2020 | Bringuier et al. | |
| 2002/0054494 A1 * | 5/2002 | Ishiharada | B60K 35/60 362/495 |
| 2011/0148661 A1 * | 6/2011 | Shikii | E01F 9/20 315/307 |
| 2013/0044501 A1 * | 2/2013 | Rudisill | F21V 29/70 362/398 |
| 2016/0053977 A1 * | 2/2016 | Johannessen | F21K 9/64 315/153 |
| 2016/0299276 A1 * | 10/2016 | Yamamoto | G02B 6/001 |
| 2016/0369958 A1 * | 12/2016 | Kohshima | F21S 8/00 |
| 2018/0284334 A1 * | 10/2018 | Keating | G02B 6/001 |
| 2019/0187352 A1 * | 6/2019 | Schabacker | G02B 6/001 |
| 2020/0191353 A1 * | 6/2020 | Heffels | H01L 23/5387 |

FOREIGN PATENT DOCUMENTS

| | | | | |
|---|---|---|---|---|
| JP | 200025865 A | | 9/2000 | |
| JP | 2000258651 A | | 9/2000 | |
| JP | 2002148467 A | | 5/2002 | |
| JP | 2016-201200 A | | 12/2016 | |
| JP | 2018-060719 A | | 4/2018 | |
| KR | 200446589 | | 11/2009 | |
| WO | WO 97/26573 | * | 7/1997 | .......... G02B 6/2817 |
| WO | 2012146960 | | 11/2012 | |
| WO | 2015056220 | | 4/2015 | |
| WO | WO 2016/018719 | * | 2/2016 | ............. F21S 43/31 |
| WO | 2017103889 | | 6/2017 | |

OTHER PUBLICATIONS

International Search Report and Written Opinion for International Application No. PCT/IB2020/062253 mailed Aug. 3, 2021, 11 pages.
International Preliminary Report on Patentability for International Application No. PCT/IB2020/062253 mailed Jun. 30, 2022, 9 pages.
Notice of the Reason for Refusal received for Japanese Application No. 2022-534203, mailed on Apr. 4, 2023, 9 pages (4 pages of English Translation and 5 pages of Original Document).
Notice of the Reason for Refusal received for Japanese Application No. 2022-534203, mailed on Jan. 11, 2024, 9 pages (4 pages of English Translation and 5 pages of Original Document).
First Office Action for Chinese Patent Application No. 202080088701.9, mailed on Dec. 7, 2023, 19 pages.
Second Office Action for Chinese Patent Application No. 202080088701.9, mailed on Jul. 19, 2024, 11 pages.
European Search Report issued for EP Patent Application No. 24182447.3, mailed on Nov. 25, 2024, 9 pages.

* cited by examiner

OPTICAL WAVEGUIDE-BASED SIDE ILLUMINATING ASSEMBLY, ELONGATED REINFORCING STRUCTURE, AND RECEPTACLE

This patent application claims the benefit of the earlier filing dates of U.S. provisional application No. 62/952,065 filed Dec. 20, 2019 and entitled, OPTICAL WAVEGUIDE-BASED SIDE ILLUMINATING ASSEMBLY AND RECEPTABLE and U.S. provisional application No. 62/952,082 filed Dec. 20, 2019 and entitled OPTICAL WAVEGUIDE-BASED SIDE ILLUMINATING ASSEMBLY HAVING ELONGATED REINFORCING STRUCTURE.

Subject matter described in this patent application is related to material disclosed in published International Applications PCT/IB2012/000617 entitled, "Waveguide apparatus for illumination systems", PCT/IB2014/065386 entitled "Holder and Systems for Waveguide-Based Illumination", and PCT/IB2016/057738 entitled, "Optical fiber light source with composite overcoating structure."

An aspect of the disclosure here is an optical waveguide based, side illuminating assembly and receptacle, that protects and makes it easier to handle the assembly during manufacturing as a component of a larger or more complex illumination device or system.

BACKGROUND

An optical fiber is known to bring an optical signal from one fiber end to another fiber end without significant losses. In other cases, the fiber is designed to leak the optical signal in a direction substantially transverse to the propagation direction of the optical signal. This effect is typically the result of the interaction of light (the optical signal) with integrated scattering structures in the fiber or the result of a specific fiber design. The scattering elements may be realized by adding elements such as impurities while drawing the fiber, by processing holes within the fiber, or through mechanical, laser or chemical processing of the fiber.

In some cases, luminescent materials are integrated inside the fiber-core material, inside the cladding or inside a coating that covers an outside surface of the fiber. The luminescent materials partially or completely convert the propagating wavelength to lower or higher wavelengths resulting in a desired illumination and wavelength, being sourced from the side of the fiber.

The illumination schemes described above may need to be controlled, conditioned, or accommodated by an appropriate waveguide holder that conforms to the side surface of the waveguide (which may be an optical fiber) and that may exhibit selected reflection, absorption or transmission characteristics in order to produce an appropriately shaped side illumination. The luminescent materials-coated fiber may be embedded in a plastic, overcoating structure of the holder, that has a polygonal bottom part, the latter enabling the holder, or waveguide-holder assembly as a whole, to be fitted into a mating, keyed receptacle of a larger or more complex system.

SUMMARY

An illumination apparatus is described in several aspects, that may provide mechanical improvements in how its elements are handled and then assembled, reinforcing (mechanically) the side-illuminating assembly apparatus, and providing electrical and optical signals about the state of the illumination apparatus.

In one aspect, the apparatus has a receptacle in which an elongated groove is formed, with a first magnetic component on the receptacle, e.g., embedded in the receptacle or attached to a surface of the receptacle such as an outside surface that defines the elongated groove. The apparatus also has a side-illuminating assembly that comprises an elongated, side-emitting light waveguide, an elongated base to which the waveguide is attached lengthwise, and a second magnetic component on the base, e.g., embedded in the elongated base or attached to a surface of the elongated base such as an outside surface that is closest to the outside surface of the receptacle.

The first magnetic component, that is on the receptacle, may be one or more permanent magnet elements, e.g., strips, embedded in or attached to a surface of the receptacle and that may extend or form a sequence along the elongated groove of the receptacle, magnetic particles embedded in, e.g., dispersed in, the receptacle, or an electromagnet embedded in or attached to a surface of the receptacle. The second magnetic component which is on the base may be at least one ferromagnetic wire that extends lengthwise (along the length of the base), a permanent magnet strip that extends lengthwise (along the length of the base), or magnetic particles embedded in the base, e.g., as a composite of magnetic particles in a polymer.

The groove has a cross sectional size or shape that enables it to receive therein the elongated base at a position that is then held by magnetic attraction between the first magnetic component on the receptacle and the second magnetic component on the base. In the case where the second magnetic component is one or more ferromagnetic wires, these serve to increase the mechanical strength of the side-illuminating assembly, as well as enable the magnetic attraction which assists in an "automatically" aligning and securing the side-illuminating assembly to the receptacle. The one or more ferromagnetic wires may also serve to carry an analog or digital electrical signal, e.g., a data signal, a control signal, power supply, or power return, from one end of the side-illuminating assembly to its other end, or they may serve as a mechanical gauge to measure for example temperature or strain.

In another aspect, a side-illuminating assembly comprises an elongated, side-emitting light waveguide, an elongated base to which the waveguide is attached lengthwise, and an elongated reinforcing structure that is embedded into or attached to a surface of the base lengthwise and serves to mechanically reinforce the side-illuminating assembly. The elongated reinforcing structure may be provided instead of a magnetic component that would be on the base, and serves to reduce the mechanical or thermal stresses that could otherwise appear during manufacturing of the side-illuminating assembly or when the side-illuminating assembly is being handled (e.g., bent) and fitted to a receptacle. Such stresses could otherwise damage an element of the side-illuminating assembly, e.g., damage to a light waveguide, any coating on the light waveguide, or a reflector. Alternatively, the elongated reinforcing structure may be provided in addition to the second magnetic component that is on the base, in order to further mechanically or thermally reinforce the base.

The elongated reinforcing structure may be one or more flexible rods made of a polymer or a metal (e.g., wire) that extend lengthwise along the base. In another aspect, the elongated reinforcing structure may be one or more optical fibers, and these may be dual purposed to carry an analog or digital optical signal, e.g., a data signal or a control signal, from one end of the side-illuminating assembly to its other end, or they may serve as a mechanical gauge for strain or for position measurements, such as a fiber Bragg grating sensor. Such dual purposing is also possible if the elongated reinforcing structure is one or more wires that can carry an analog or digital electrical signal or they can serve as a mechanical gauge to for example measure temperature as would a thermistor.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, a given figure may be used to illustrate the features of more than one aspect of this disclosure, and not all elements in the figure may be required for a given aspect.

DETAILED DESCRIPTION

Several embodiments of the invention with reference to the appended drawings are now explained. Whenever the shapes, relative positions and other aspects of the parts described in the embodiments are not explicitly defined, the scope of the invention is not limited only to the parts shown, which are meant merely for the purpose of illustration. Also, while numerous details are set forth, it is understood that some embodiments of the invention may be practiced without these details. In other instances, well-known structures and techniques have not been shown in detail so as not to obscure the understanding of this description.

Figure 2:
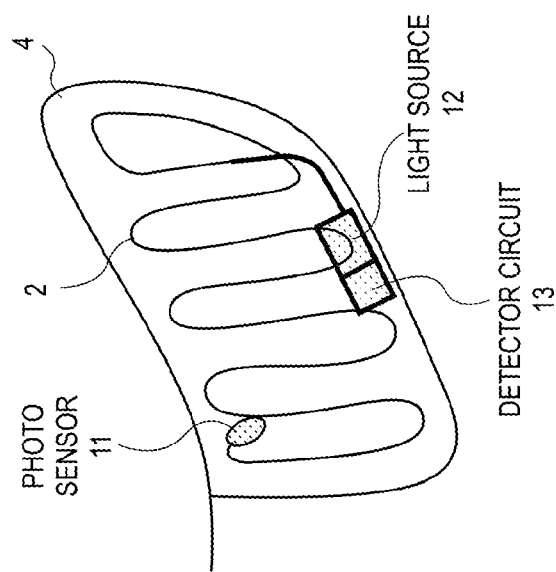
FIG. 2 is a top view of the illumination apparatus also depicting a photo sensor, a light source, and an electrical detector circuit.
Figure 1:
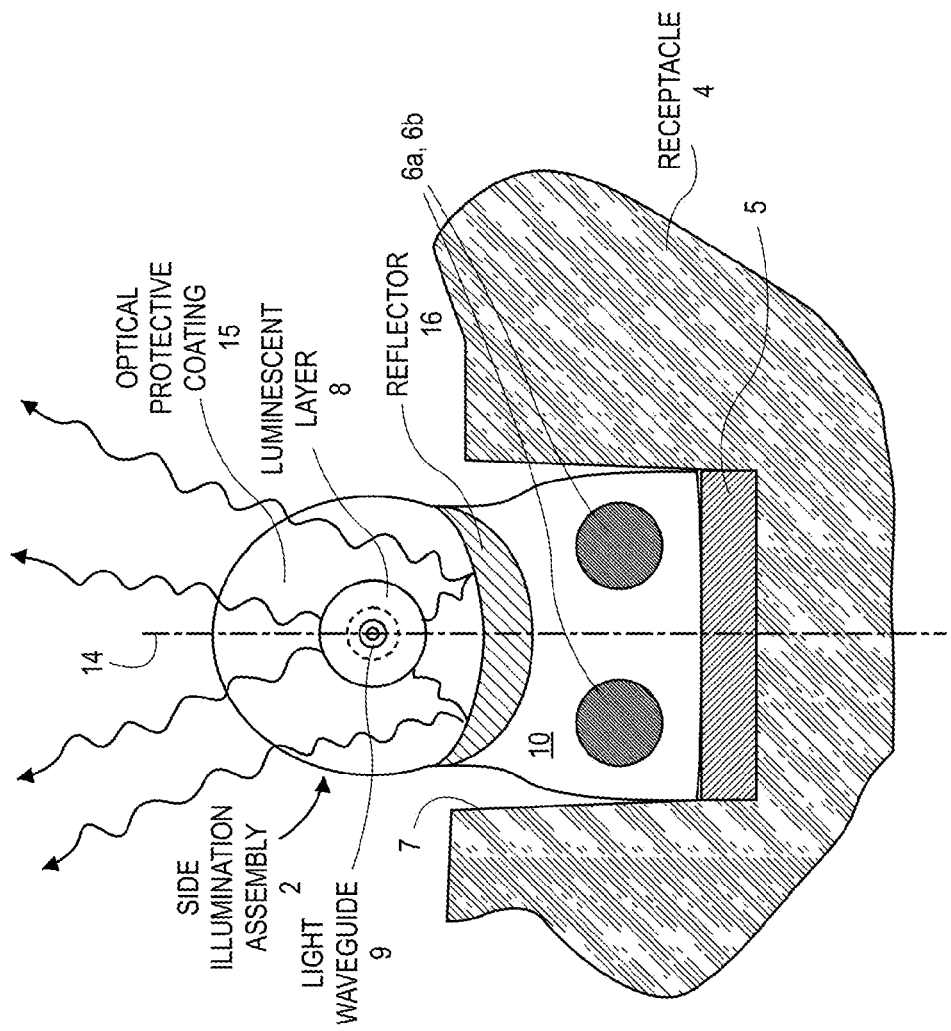
FIG. 1 depicts an end view at a cross section taken in a transverse plane of an example illumination apparatus that is based on a side emitting light waveguide.

In accordance with several aspects of the disclosure here, and referring now to FIG. 1, an end view, at a cross section taken in a transverse plane, of an example illumination apparatus is shown. The illumination apparatus includes a side illuminating assembly 2 that contains an elongated, side emitting light waveguide 9 (e.g., an optical fiber) that is surrounded by an optical protective coating 15, which are elongated in the length direction as best seen in a top view shown in FIG. 2. FIG. 2 is an example, being part of an automobile headlight, where the side illuminating assembly 2 forms a snake-like pattern that lies in essentially a plane as shown, extending from a light source 12 at one end portion to a photo sensor 11 at another end portion. The light source 12 is configured to inject light into one end portion of the waveguide 9, which becomes propagating light that is out coupled from the waveguide 9 at locations downstream of the light source 12, along the side of the waveguide 9. This is illumination light that then passes through and emerges from the outside surface of the optical protective coating 15 (as depicted by the wavy arrows in FIG. 1.) The photosensor 11 detects propagating light further downstream, for example at another end portion of the waveguide 9. The photo sensor 11 may detect light "at the end" of the waveguide 9, which is propagating light that has not been emitted out of the side of the waveguide 9 as the intended illumination. The photosensor 11 may be omitted.

The illumination apparatus also includes a receptacle 4 in which an elongated groove is formed. An outside surface 7 of the receptacle 4 defines the elongated groove and its cross section shape. The elongated groove is sized or shaped to receive therein a base 10 of the side illuminating assembly 2. The groove in this example has a generally U-shaped cross section (taken in a transverse plane), but the cross section could alternatively be generally V-shaped or have another generally polygonal shape that may be more complex than a U or a V, and that is able to laterally support the base 10. In one aspect, the groove and in particular its cross section may be keyed to (or mates with) the cross section of the base 10 so that the base 10 may be received into the groove in only one orientation (about a center axis of the waveguide 9.) The receptacle 4 may be made of a stiffer material than the base 10, so that the base 10 and the side illuminating assembly 2 as a whole can be bent to conform with the shape or lengthwise contour of the groove. This facilitates assembling the side-illuminating assembly and the receptacle (into an illumination apparatus.) The receptacle may be made of a polymer (e.g., a plastic), a composite material or a metal, and it may be of a stiffer material than the base 10 which may also be made of a polymer.

A first magnetic component 5 may be embedded in the receptacle 4, or (in the example shown) it may be attached to the outside surface 7 of the receptacle 4 that defines the elongated groove, or it may be attached to another surface of the receptacle. In one aspect, the first magnetic component 5 extends lengthwise along the elongated groove, and may be composed of one or more magnet elements such as one or more permanent magnet strips that form a sequence or otherwise extend along the length of the groove. In the aspect illustrated in FIG. 1, the one or more magnet elements that make up the first magnetic component 5 are positioned along a bottom of the U-shaped cross section of the receptacle 4. This is in contrast to the aspect illustrated in FIG. 4 in which the one or more magnet elements (that make up the first magnetic component 5) are positioned along a side of the U-shaped cross section.

The side-illuminating assembly 2 includes the elongated, side-emitting light waveguide 9, an elongated base 10 to which the waveguide 9 is attached lengthwise via the protective coating 15, and a second magnetic component composed in one particular example of a first ferromagnetic wire 6a and a second ferromagnetic wire 6b. The base 10 may be made of a polymer, e.g., a plastic. The wires 6a, 6b are either embedded in the elongated base 10 as shown, or they may be attached to an outside surface of the elongated base, and in either case are extending lengthwise as shown. The side illuminating assembly 2 can be fitted or placed into the groove of the receptacle 4, and is then held in position in the length direction, by magnetic attraction between the first magnetic component 5 and the second magnetic component. In other words, movement of the side illuminating assembly 2 in the length direction is constrained by the magnetic attraction. In the particular example shown, the side illuminating assembly 2 is held in position or constrained in the width (lateral or transverse) direction, because the base 10 abuts the left and right side walls of the groove. In other words, movement of the side illuminating assembly in the width direction is constrained by the base 10 being sized and shaped to abut against the left and right side walls of the groove. The magnetic attraction enables the side illuminating assembly 2 while outside the groove to be moved freely in the lateral direction, before being directed into the receptacle, at which point the magnetic attraction may be relied upon to "automatically" pull the side illuminating assembly 2 further downward into the groove until a stop is reached. In the examples shown in the figures, that stop is when the bottom of the base 10 abuts the bottom of the groove. Once in that final position, the side illuminating assembly 2 is held or constrained lengthwise, by the magnetic attraction.

The ferromagnetic wires 6a, 6b increase the strength of the side-illuminating assembly, where such reinforcement may reduce the mechanical or thermal stresses that could otherwise appear during manufacturing of the side-illuminating assembly or when the side-illuminating assembly is being handled and fitted to the receptacle, which stresses could otherwise damage an element of the side-illuminating assembly, e.g., a light waveguide, any coating on the light waveguide, or a reflector. In addition, the wires 6a, 6b enable the magnetic attraction which assists in "automatically" aligning and securing the side-illuminating assembly 2 to the receptacle. In a further aspect described below, the ferromagnetic wires 6a, 6b can also carry an analog or digital electrical signal, e.g., a data signal, a control signal, power supply, or power return, from one end of the side-illuminating assembly to its other end.

Still referring to FIG. 1, in the particular example shown, the first magnetic component 5 includes or may be composed of one or more magnet elements. The ferromagnetic wires 6a, 6b are magnetically attracted to the one or more magnet elements of the first magnetic component 5. In this example, the first ferromagnetic wire 6a is positioned left of a vertical longitudinal center plane 14 of the side-illuminating assembly 2, while the second ferromagnetic wire 6b is positioned right of the vertical longitudinal center plane 14. The vertical longitudinal center plane 14 runs lengthwise along the side-illuminating assembly 2. This positioning of the wires 6a, 6b helps make efficient use of the available volume in the base 10, and also balances the magnetic attraction force.

In one aspect of the disclosure here, the ferromagnetic wires 6a, 6b are multi-purposed, to also serve as an electrical path from one end of the side-illuminating assembly to another, as follows. Each of the ferromagnetic wires extends lengthwise continuously from a first end portion of the waveguide 9 to a second end portion of the waveguide 9, and is conductive and therefore able to carry an electrical signal such as a "feedback signal" that is indicative of how the illumination apparatus may be performing. More specifically, in the first end portion, as seen in the example of FIG. 2, a photosensor 11 (such as a photodiode or a phototransistor) may be added, that is configured to detect propagating light in the waveguide 9. The first ferromagnetic wire 6a at one end is coupled to an electrical terminal of the photosensor 11, and at another end is coupled to an electrical detector circuit 13. Similarly, the second ferromagnetic wire 6b at one end is coupled to another electrical terminal of the photosensor 11, and at another end is coupled to the electrical detector circuit 13. The electrical detector circuit could be an analog comparator, or it may include an analog to digital converter as part of a digital comparison function, that compares a signal, produced by the photosensor 11 and carried through one or more of the wires 6a, 6b, to a set of one or more thresholds. Some action may then be taken based on a result of the comparison. For instance, an electrical control circuit (not shown) may be coupled to the light source 12 and can control how much light is injected by the light source into the waveguide 9, responsive to an output of (e.g., a result of the comparison made by) the electrical detector circuit 13. For example, if the signal is below a minimum threshold, then some optical aspect of the side-illuminating waveguide 9 could have failed in which case the control circuit turns off the light source 12. If the signal is above the minimum threshold but below an intermediate threshold, then perhaps there is insufficient side-illuminating power in which case the control circuit signals the light source 12 to increase its output light power. If the signal is above a maximum threshold, then perhaps there is too much side-illuminating power in which case the control circuit signals the light source 12 to decrease its output light power. Other types of analog or digital electrical signals may be carried by the ferromagnetic wires 6a, 6b, e.g., where the photosensor 11 is omitted but the electrical signal carried by the ferromagnetic wires 6a, 6b is produced by another type of sensor or electrical signal generating circuit.

More generally than what is shown in FIG. 1, the second magnetic component that is on the side-illuminating assembly 2 may be one or more (including two or more) ferromagnetic wires, each one extending lengthwise along the base 10. For example, there may only be a single ferromagnetic wire that may be centered along the vertical plane 14, or there may be three wires (e.g., a single wire at the center and one to the left and one to the right preferably symmetrically relative to the vertical plane 14.) In another aspect, not shown in FIG. 1, the second magnetic component may be one or more magnet elements such as permanent magnet elements (embedded in the base 10 or attached to its surface) that form a sequence or otherwise extend lengthwise along the base 10. Such solutions may also provide the advantage of mechanical reinforcement of the side-illuminating assembly 2 that would be provided by the ferromagnetic wires 6a, 6b. In yet other alternatives (not shown in FIG. 1), the second magnetic component that is on the side illuminating assembly 2 may be an electromagnet (having coils for example that are formed in the base 10) or it may be magnetic particles dispersed in the base 10 such as where the base 10 is made of a composite of magnetic particles in a polymer.

As to the first magnetic component 5 that is on the receptacle 4, it may be one or more magnet elements that are embedded in the receptacle 4 or attached to a surface thereof (e.g., the outside surface 7), for example forming a sequence or otherwise extending lengthwise along the base 10. The one or magnet elements may be permanent magnet elements, or they may be an electromagnet. In yet another aspect, the first magnetic component 5 may be magnetic particles embedded in, e.g., dispersed in, the receptacle 4.

It should be noted that although FIG. 1 shows the side illumination assembly 2 as being composed of the optical protective coating 15 being attached to the base 10, those two elements may be made of the same material, e.g., a transparent polymer, and may be formed integrally as one piece such as by an extrusion process. This may be viewed another way, as the base 10 being an extension of the optical protective coating 15 that fits into the groove of the receptacle 4, or that the elongated reinforcement structure 20 is embedded in or is attached to an outer surface of the optical protective coating.

Figure 3:
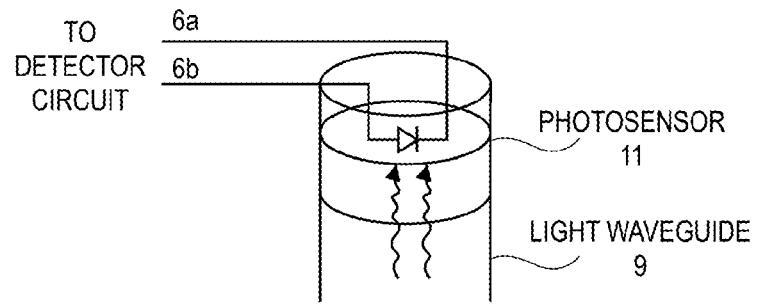
FIG. 3 illustrates the coupling between the photo sensor and a light waveguide.
Figure 4:
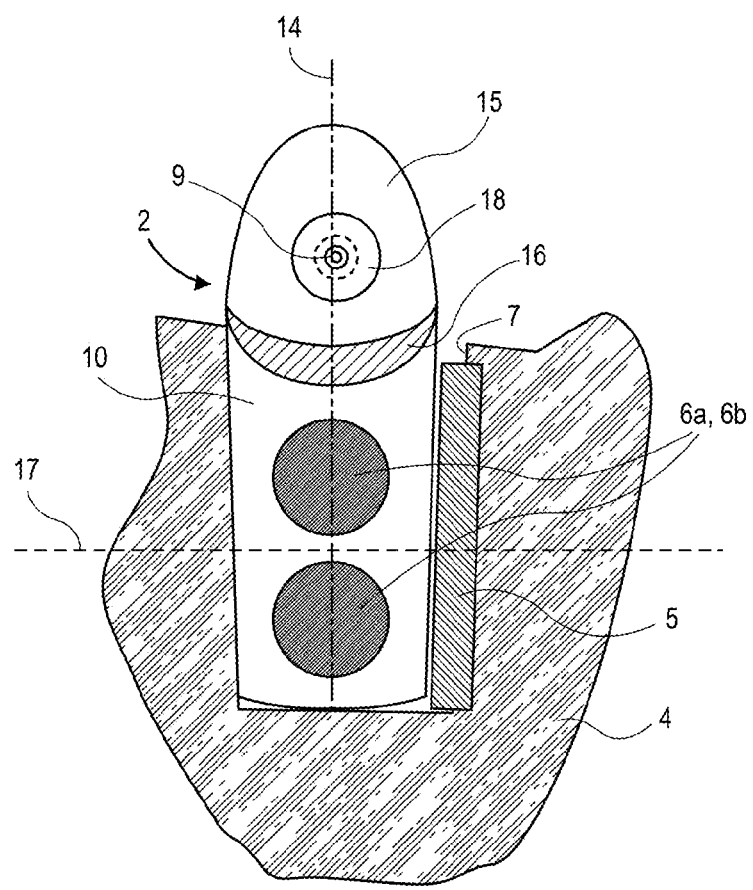
FIG. 4 is an end view at a cross section taken in a transverse plane of another example illumination apparatus that is based on a side emitting light waveguide.

Referring now to FIG. 4, this is an end view at a cross section taken in a transverse plane of another example illumination apparatus, that is also based on the side emitting light waveguide 9. All of the arrangements and variations in the elements of FIG. 1 described above are applicable to the same referenced elements shown in FIG. 4, and any aspects described above in connection with FIG. 2 and FIG. 3 are also applicable to the aspects illustrated in FIG. 4, except for the following. The first magnetic component 5 here comprises one or more magnet elements that are positioned along a side of the U-shaped cross section (of the receptacle 4), rather than along the bottom. Also, the first ferromagnetic wire 6a is now positioned above a horizontal longitudinal plane 17 of the base 10 (which of course is part of the side-illuminating assembly 2), while the second ferromagnetic wire 6b is positioned below the horizontal longitudinal plane 17. This may be referred to as a vertical or stacked arrangement of the wires 6a, 6b, in contrast to a horizontal or flat arrangement seen in FIG. 1. The vertical arrangement may have some advantages over the horizontal arrangement, in that the diameter of the wires 6a, 6b may be selected to be greater (for the same width of the base 10), along with greater stability and orientation-adjustability. Note also that in FIG. 4, the first magnetic component 5 is partially embedded in the receptacle as shown. Alternatives include fully embedding the component 5 (e.g., below the surface 7), or attaching the component to the surface 7 so that it lies entirely outside the receptacle 4 as seen in FIG. 1.

Figure 5:
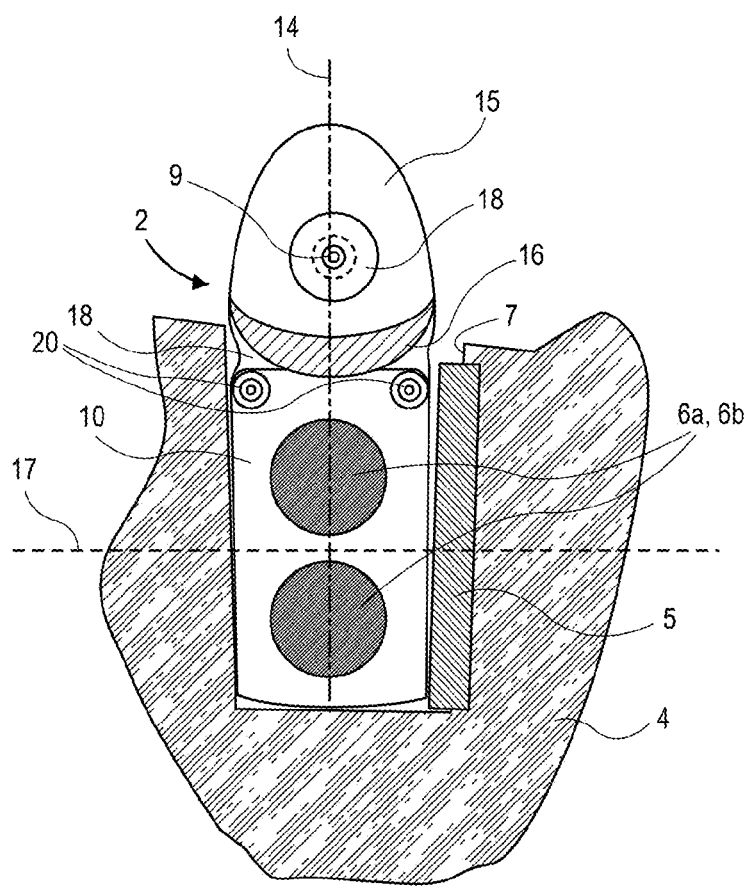
FIG. 5 is an end view at a cross section taken in a transverse plane of another example illumination apparatus that is based on a side emitting light waveguide.

Turning now to FIG. 5, this is an end view at a cross section taken in a transverse plane of another example illumination apparatus. Several aspects are shown in this figure. In one aspect, an elongated reinforcing structure 20 is on the base 10, for example embedded in the elongated base 10 as shown, or alternatively attached to an outside surface of the elongated base 10. The elongated reinforcing structure 20 is seen as extending lengthwise along the elongated base 10, and may be either in addition to or an alternative to the ferromagnetic wires 6a, 6b. In other words, in one variation of what is shown in FIG. 5, the ferromagnetic wires 6a, 6b (as an example of the second magnetic component described above in connection with FIG. 1) are omitted from the side illuminating assembly 2. This is possible because the elongated reinforcing structure 20 may be designed to mechanically reinforce the side-illuminating assembly by itself (without relying on the additional reinforcement provided by the ferromagnetic wires 6a. 6b.) Such reinforcement may reduce the mechanical or thermal stresses that could otherwise appear during manufacturing of the side-illuminating assembly 2 that is shown, or when the side-illuminating assembly is being handled and fitted to the receptacle 4, which stresses could otherwise damage an element of the side-illuminating assembly, e.g., the light waveguide 9, the optical protective coating 15, any other coating on the light waveguide such as a luminescent layer 8 described below, or a reflector 16 also described below.

The elongated reinforcing structure 20 may be one or more flexible rods that extend lengthwise along the base 10. As seen in the example of FIG. 5, there are two rods that are positioned symmetrically to the left and to the right, respectively, of the vertical longitudinal center plane 14 that runs lengthwise along the base 10. More generally however, there may be one or more of such rods on the base 10. The rods may be optical fibers, composite rods, metal rods (wires) or rods made of polymer. In the case of optical fibers, the rods can be dual purposed (in addition to providing mechanical strength to the assembly 2) to carry an analog or digital optical signal, e.g., a data signal, a control signal, from one end of the side-illuminating assembly 2 along its length and to its other end, or to be part of a mechanical gauge such as for strain measurements or for position or orientation measurements, e.g., a fiber Bragg grating sensor. This dual purposing is also possible if the elongated reinforcing structure 20 is one or more wires (e.g., that can carry an analog or digital electrical signal or that serve as part of a mechanical gauge such as for making a temperature measurement or a strain measurement.)

Most of the description above given in connection with FIGS. 1-4 is applicable to the similar elements that appear in FIG. 5, including the base 10 and the optical protective coating 15. For instance, the optical protective coating 15 in the example of FIG. 5 may be co-extruded with the base 10 and the elongated reinforcing structure 20 embedded therein. But FIG. 5 also depicts another approach for attaching the optical protective coating 15 to the base 10, namely by bonding the two to each other using an adhesive layer 18 (e.g., glue.) That bonding operation may follow a separate operation in which the optical protective coating 15 is formed on the outside surface of the waveguide 9 or on the outside surface of the luminescent layer 8. Note here that in cases where the reflector 16 is to be included as shown, one face of the reflector 16 may have been affixed to the outside surface of the protective coating 15 in a separate operation, prior to bonding the opposite face of the reflector 16 to the base 10 via the adhesive layer 18.

Figure 6:
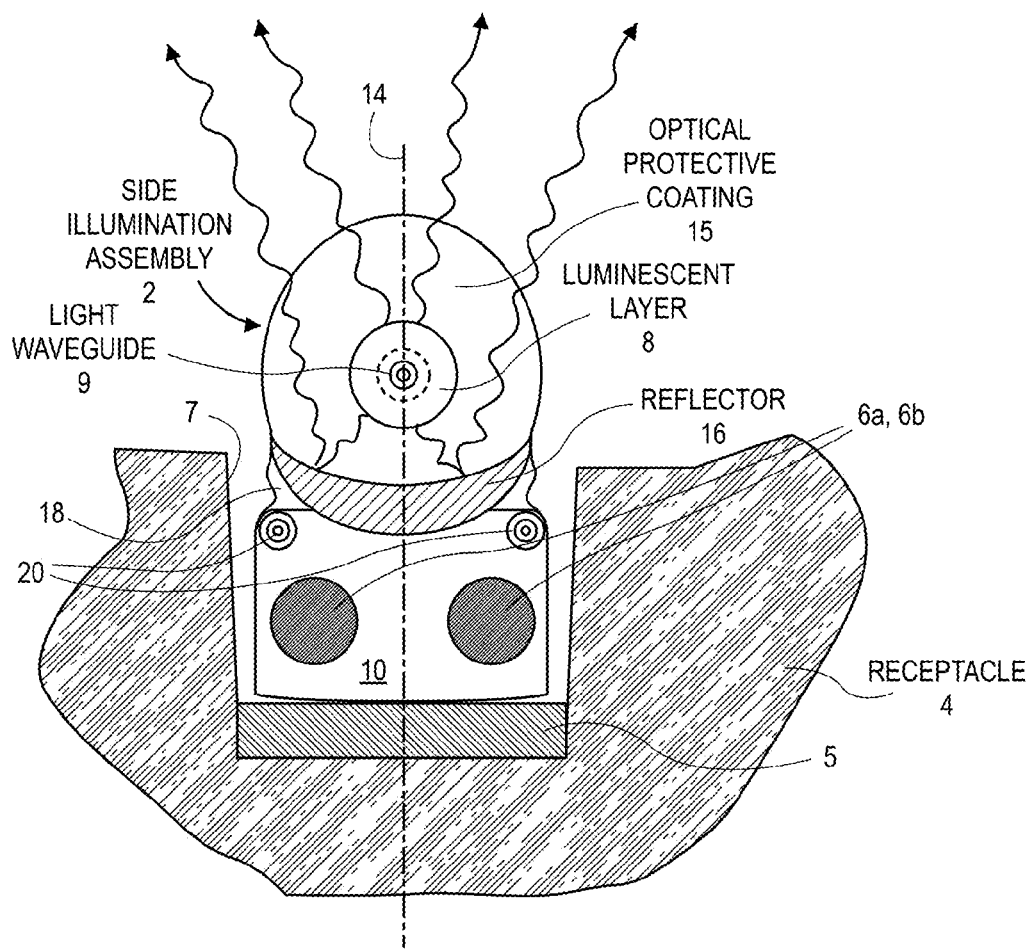
FIG. 6 is an end view at a cross section taken in a transverse plane of yet another example illumination apparatus that is based on a side emitting light waveguide.

Referring now to FIG. 6, another aspect of this disclosure is shown that features the elongated reinforcing structure 20. In this case, the structure 20 is added to the base 10 of a version of the side-illuminating assembly 2 that is similar to the one shown in FIG. 1, where the ferromagnetic wires 6a, 6b are laid flat (rather than stacked as in FIG. 4 and FIG. 5). Some advantages of the aspects shown in FIG. 5 also appear in FIG. 6, namely that the "coated waveguide" (the integrated combination of the waveguide 9, the optional luminescent layer 8, and the optical protective coating 15) can be formed separately than the base 10 and then may be bonded to base 10 via the adhesive layer 18, e.g., using glue. This results in an illumination apparatus (side-illuminating assembly 2 and receptacle 4) that is easier to assemble from an orientation and position standpoint due to the magnetic attraction, and that is more stable and stronger in terms of mechanics due to the addition of the elongated reinforcing structure 20. The variations described above in connection with FIG. 1 (e.g., variations with respects to the first magnetic component 5 on the receptacle 4, and variations with respect to the second magnetic component on the base 10) are also applicable to the aspects shown in FIG. 6 given the same reference numbers used in FIG. 6.

In all of the above described aspects, and referring now to FIG. 1 for example, the side-illuminating assembly 2 may further include a luminescent layer 8 surrounding the waveguide 9 and a reflector 16 between the protective coating 15 and the base 10. This combination produces side illumination as follows. The waveguide 9 may be an optical fiber having a core and a cladding and in which primary propagating light is produced by the light source 12, e.g. a laser, or a light emitting diode (LED) that is coupled to the fiber. The primary light propagates along a center longitudinal axis of the fiber, in a downstream direction as shown, until it is scattered out of the fiber through a side of the fiber, by a scattering zone (e.g., formed in a core of the fiber.) Note that the light source 12 may be located away from the illumination space (that is being illuminating by the side-illuminating assembly), because the primary light from the light source may be efficiently delivered to the scattering structures via propagation through an upstream portion of the fiber. The scattered radiation or outcoupled light takes place in a direction substantially transverse to the longitudinal axis of the fiber, either in a directional manner (forming a cone or lobe of light having a radial span of under 360° or in an isotropic or omnidirectional manner (radiating at equal strength all around the fiber). Examples of scattering zones that can yield such a result can be found in international patent application no. PCT/IB2012/000617 (WAVEGUIDE APPARATUS FOR ILLUMINATION SYSTEMS) filed 28 Mar. 2012. In cases where the directional side emission is especially efficient, the reflector 16 could be omitted. Other types of side-emitting optical fibers can alternatively be used.

The fiber has formed on it the luminescent layer 8, which may be a coating formed on the outside surface of the waveguide 9 and that is made of photoluminescent material that performs wavelength conversion upon the primary propagating light into secondary light, to result in a side-emitted light that includes secondary light having a different wavelength than the primary light. The resulting side-emitted light may exhibit a broader spectrum as compared to the primary light, e.g. white light resulting from the combination of unabsorbed primary light and the secondary light. Alternatively, the photoluminescent material in the layer 8 and the wavelength of the primary light may be selected such that very little primary light is left unabsorbed (for example as detected by the photosensor 11), resulting in the side-emitted light emerging from the fiber being dominated by the secondary light, e.g. red or infrared.

In another aspect, the luminescent layer 8 as a coating formed on the outside surface of the waveguide is absent, either because the photoluminescent material has been incorporated directly into the waveguide 9 or it has been positioned outside of the side-illuminating assembly 2. In yet another aspect, no photoluminescent material is present either inside the waveguide 9 or as an outside coating such that the side emitted light from the side-illuminating assembly 2 is all primary light.

The light source 12 may be any suitable radiation source having one or more emitters. The source may have an incoherent, relatively broad spectrum such as from a discharge lamp or a light emitting diode, LED. It may also be an organic light emitting diode (OLED) or a source based on quantum dots. The source may alternatively be a coherent, sharp spectrum light source such as a laser emitting a single wavelength (also referred to here as quasi single wavelength), or it may be multiple single wavelength lasers. The source is not limited to a specific part of the light spectrum. Examples include a source that emits substantially in the ultraviolet, visible or infrared part of the spectrum.

The optical fiber may be any suitable optical fiber such as single clad, multi-dad, photonic-crystal or micro-structured optical fiber. The fiber may be passive, i.e. the light propagates substantially at the same wavelength all along the fiber, or it may be active i.e., the propagating light is partially or totally converted by luminescent species or material implemented inside the fiber core, the cladding or inside a coating of the fiber (e.g., the luminescent layer 8 shown in FIG. 1.)

In yet another aspect, the optical fiber could be replaced by another suitable waveguide, such as a light pipe having a core medium but no cladding layer, e.g. a transparent rod.

The scattering structures may be particles, impurities, or holes directly integrated during fabrication of the waveguide (e.g., during the drawing of the optical fiber). The scattering structures may be continuous or discontinuous laser-induced structures; these may be formed through the application of external intense laser light to selected locations in the waveguide. The location, the shape, the size, the scattering strength, the tilt or orientation, and periodicity of the scattering structures, along and across (transverse to) the guided light propagation direction (longitudinal axis) in the waveguide can be selected, by adapting the focus, intensity and position of the external processing laser. Specifically, these parameters may be adapted to obtain a desired radiation pattern. The scattering structure may also be mechanical taps chemically or mechanically processed on the fiber cladding.

In another embodiment, the out-coupled light may be pursuant to a leaky mode of propagation in the waveguide 9. The leaky mode may occur due to interaction of the propagating light with changes, such as a gradient, in the index of refraction of the fiber waveguide or changes in the radius or geometry of the fiber (which changes may have been induced while drawing the fiber, for example).

The luminescent or photo-luminescent species or material that may be within the waveguide itself or in the luminescent layer 8 may be any material that absorbs light at a certain wavelength and in response re-emits light at another wavelength. For instance, these materials can be one or several phosphors that re-emit light at longer wavelengths (down-conversion phosphors) or at shorter wavelengths (up-conversion phosphors). These species can also be one or several types of quantum dots. In one aspect, the addition of the photo-luminescent material is designed to efficiently produce white illumination light suitable for illuminating samples for quality inspection, where the white light is a combination of the scattered and out-coupled "primary" light that has been wavelength converted into "secondary" light, plus any portion of the primary out-coupled light that was not wavelength converted.

The protective coating 15 and the base 10 together hold the fiber in place and may allow the assembly to be gripped. In one aspect, the base 10 and the optical protective coating 15 might be made of the same material, e.g., a light transmitting polymer, e.g. a transparent polymer. The base 10 and the protective coating 15 (which surrounds the light waveguide 9 and, if used, the luminescent layer 8) may be co-extruded, to thereby be formed together as an integrated piece in which the reflector 16 (if chosen to be included) is embedded between the base and the optical protective coating 15. Alternatively, for example as seen in FIG. 5, an adhesive layer 18 (e.g., glue) that bonds the protective coating 15 or the reflector 16 to the base 10 may be used.

The optical protective coating 15 may play an active role, i.e. to directly or indirectly impact the shape, the spectrum, and/or the polarization of the illumination pattern and its spatial distribution. In another embodiment, part of the protecting coating 15 can be made of an absorptive material such that it selectively suppresses or blocks one or more portions of the out-coupled light, i.e. in a spatial sense. Alternatively, the absorptive material may be designed to selectively suppress or block a portion of the spectrum of the out-coupled light, so that for instance the resulting illumination pattern contains only selected wavelengths or colors. This may be combined with the reflection of the outcoupled light, by the reflector 16.

The reflector 16 can partially or completely be made out of a reflective material or a diffusing material such that it spreads or re-directs a portion of the out-coupled light, or a portion of the spectrum of the out-coupled light, that is scattered out of the side of the waveguide 9 as shown in FIG. 1 for example.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

What is claimed is:

1. An optical waveguide based side illuminating assembly, comprising:
   an elongated, side-emitting light waveguide;
   an optical protective coating surrounding the waveguide;
   an elongated base to which the waveguide is attached lengthwise along the elongated base, via the optical protective coating;
   a reflector that extends lengthwise along the base and is disposed between the optical protective coating and the elongated base; and
   an elongated reinforcing structure that comprises a flexible rod that is embedded in the elongated base and extends lengthwise along the elongated base, wherein the flexible rod is an optical fiber.

2. The side illuminating assembly of claim 1, wherein the flexible rod is a first flexible rod, wherein the elongated reinforcing structure comprises a second flexible rod that extends lengthwise along the base, the first flexible rod and the second flexible rod are positioned symmetrically left and right, respectively, of a vertical longitudinal center plane that runs lengthwise.

3. The side illuminating assembly of claim 2 wherein the second flexible rod is an optical fiber.

4. The side illuminating assembly of claim 1 further comprising an adhesive layer that bonds the protective coating or the reflector to the base.

5. The side illuminating assembly of claim 1 wherein the base and the protective coating are of dissimilar materials.

6. The side illuminating assembly of claim 1 wherein the elongated base is made of a polymer.

7. An optical waveguide based side illuminating assembly, comprising:
   an elongated, side-emitting light waveguide;
   an elongated, optical protective coating entirely surrounding the waveguide; and
   an elongated base that includes a first flexible rod and a second flexible rod that are both embedded in and extend lengthwise along the elongated base,
   wherein the optical protective coating and the elongated base are formed integrally as one piece of a same material,
   wherein at least one of the first and second flexible rods is an optical fiber.

8. The side illuminating assembly of claim 7 further comprising a magnetic component that is embedded in and extends lengthwise along the elongated base.

9. The side illuminating assembly of claim 8 wherein magnetic attraction between the magnetic component and another magnetic component on a receptacle holds the elongated base against the receptacle.

10. The side illuminating assembly of claim 7, wherein the other of the at least one of the first and second flexible rods is a metal rod and the same material is a light transmitting polymer.

11. The side illuminating assembly of claim 7, wherein the first and second flexible rods are positioned symmetrically left and right, respectively, of a vertical longitudinal center plane that runs lengthwise along the side illuminating assembly.

12. The side illuminating assembly of claim 7 wherein both of the first and second flexible rods are optical fibers.

13. The optical waveguide based side illuminating assembly of claim 7, wherein the optical protective coating is shaped differently than the elongated base along a cross-section of the side illuminating assembly.

14. An illumination apparatus comprising:
    a receptacle in which an elongated groove is formed;
    a first magnetic component on the receptacle; and
    a side-illuminating assembly that comprises:
       an elongated, side-emitting light waveguide,
       an elongated base to which the waveguide is attached lengthwise, and
       a second magnetic component on the base,
    wherein the elongated groove is sized to receive therein the elongated base at a position that is held by magnetic attraction between the first magnetic component and the second magnetic component,
    wherein the first magnetic component comprises a magnet element that is embedded in the receptacle or attached to a surface of the receptacle, and the second magnetic component comprises a ferromagnetic wire that extends lengthwise along the base.

15. The illumination apparatus of claim 14, wherein the ferromagnetic wire is a first ferromagnetic wire, wherein the second magnetic component comprises a second ferromagnetic wire, wherein both the first and second ferromagnetic wires extend lengthwise continuously from a first end portion of the waveguide to a second end portion of the waveguide.

16. The illumination apparatus of claim 15 further comprising:
    a photosensor that is configured to detect propagating light in the first end portion of the waveguide; and
    an electrical detector circuit,
    wherein the first and second ferromagnetic wires at one end are coupled to first and second electrical terminals of the photosensor, and at another end are coupled to the electrical detector circuit.

17. The illumination apparatus of claim 16 further comprising:
    a light source configured to inject light into the second end portion of the waveguide; and
    an electrical control circuit coupled to the light source to control how much light is injected by the light source into the waveguide.

18. The illumination apparatus of claim 15 further comprising an electrical detector circuit coupled to the first and second ferromagnetic wires at the second end portion of the waveguide to measure temperature or strain using the first or second ferromagnetic wires as a mechanical gauge.

19. The illumination apparatus of claim 14, wherein the ferromagnetic wire is a first ferromagnetic wire, wherein the illumination apparatus further comprises:
    a photosensor configured to detect light in a first end portion of the waveguide; and an electrical detector circuit, wherein the second magnetic component comprises the first ferromagnetic wire and a second ferromagnetic wire each extending lengthwise continuously from the first end portion of the waveguide to a second end portion of the waveguide, one end of the first ferromagnetic wire is coupled to a first electrical terminal of the photosensor, one end of the second ferromagnetic wire is coupled to a second electrical terminal of the photosensor, another end of the first ferromagnetic wire at the second end portion of the waveguide is coupled to the electrical detector circuit, and another end of the second ferromagnetic wire at the second end portion of the waveguide is coupled to the electrical detector circuit.

20. The illumination apparatus of claim 19 further comprising:

a light source configured to inject light into the second end portion of the waveguide; and an electrical control circuit coupled to the light source to control how much light is injected by the light source into the waveguide, responsive to an output of the electrical detector circuit.

21. The illumination apparatus of claim 14 wherein the magnet element is a permanent magnet.

22. An optical waveguide based side illuminating assembly, comprising:

an elongated, side-emitting light waveguide; and an elongated base to which the waveguide is attached lengthwise, wherein the elongated base comprises a flexible optical fiber and a pair of ferromagnetic wires, wherein the flexible optical fiber and the pair of ferromagnetic wires are embedded into and extend along a length of the elongated base, wherein the pair of ferromagnetic wires are in a stacked arrangement such that one of the ferromagnetic wires is positioned above a horizontal longitudinal plane of the elongated base and the other ferromagnetic wire is positioned below the horizontal longitudinal plane.

* * * * *